United States Patent [19]

Braginsky et al.

[11] Patent Number: 4,517,707
[45] Date of Patent: May 21, 1985

[54] APPARATUS FOR RECOVERING MEAT OF SMALL CRUSTACEANS

[75] Inventors: Yakov I. Braginsky; Igor V. Gultsev; Viktor A. Mitrofanov; Nikolai A. Nikitushkin; Yury F. Yaroshenko, all of Moscow, U.S.S.R.

[73] Assignee: Vsesojuzny Nauchno-Issledovatelsky I Exerimentalno-Konstruktorsky Institut Prodovol-Stvennogo Mashinostroenia, Moscow, U.S.S.R.

[21] Appl. No.: 474,662

[22] PCT Filed: Jul. 1, 1982

[86] PCT No.: PCT/SU82/00023
§ 371 Date: Mar. 1, 1983
§ 102(e) Date: Mar. 1, 1983

[87] PCT Pub. No.: WO83/00080
PCT Pub. Date: Jan. 20, 1983

[30] Foreign Application Priority Data

Jul. 8, 1981 [SU] U.S.S.R. ................................ 3312681
Jun. 18, 1982 [SU] U.S.S.R. ................................ 3448077

[51] Int. Cl.³ ............................................. A22C 29/02
[52] U.S. Cl. ............................................. 17/71; 17/46
[58] Field of Search ................. 17/51, 71, 73, 48, 46

[56] References Cited

U.S. PATENT DOCUMENTS 2,608,716  9/1952  Harris ................................. 17/74 X
3,408,686 11/1968  Stephenson ........................ 17/71
4,307,492 12/1981  Braginsky et al. ................. 17/71

Primary Examiner—Willie G. Abercrombie
Attorney, Agent, or Firm—Burgess, Ryan & Wayne

[57] ABSTRACT

The apparatus for recovering meat of small crustaceans comprises a mechanism 1 for breaking-up the shell of the crustaceans, a mechanism 3 for separating the meat from other components and a mechanism 2 for separating the easily rising components of the crustaceans, arranged intermediate the shell breaking-up mechanism 1 and the meat-separation mechanism 3. The mechanism 2 for separating the easily rising components includes a separating chamber 9 filled with the working liquid and having in its upper part a pipe 10 for withdrawing the surfaced components of the crustaceans, and in its bottom part a line 11 for withdrawing the settled components of the crustaceans, of which the inlet end 12 is equipped with a liquid-type ejector 13, while its outlet end 14 is situated above the level of the liquid in the separating chamber 9, to overlie the loading funnel 23 of the meat separation mechanism 3, and a connection line 15 connecting the separating chamber 9 with the receiving hopper 16. The latter underlies the diffuser 8 of the shell breaking-up mechanism 1 and the line 18 for supplying the working liquid. The apparatus is particularly intended for processing antarctic shrimp (krill).

7 Claims, 5 Drawing Figures

APPARATUS FOR RECOVERING MEAT OF SMALL CRUSTACEANS

FIELD OF THE INVENTION

The invention relates to technologies of processing food obtained from sea catches, and more particularly it relates to apparatus for recovering meat of small crustaceans, of antarctic krill, in particular.

DESCRIPTION OF THE PRIOR ART

Krill has become nowadays one of the most promising large scale sources of protein of animal origin. High-quality protein is contained in krill meat, while other components of krill either have a limited value as a food or are altogether inedible and utilizable solely for technological purposes. Therefore, the development of an industrial technology of processing krill into food involves the necessity of finding efficient techniques and plant for recovering krill meat and separating it from other components.

There is known an apparatus for removing the shells of small crustaceans, particularly, of antarctic krill, comprising a loading mechanism, an air duct, a connection for feeding compressed air and a shell breaking-up mechanism wherein the air duct includes a series connection of a bell mouth or funnel, a plain-wall curving pipe, a spring and a diffuser (cf. U.S. Pat. No. 4,251,902 dated Feb. 24, 1981).

This apparatus provides for processing small crustaceans over the entire range of their sizes and offers reliable and highly efficient performance.

However, this apparatus, while breaking-up the shell and other components of krill, performs but partial separation of the meat from other components. Therefore, to complete the recovery of the meat, it is necessary to resort to conventional techniques, e.g. to that of flotation, which incurs significant waste of the meat and also its saturation with magnesium and calcium salts when sea water is used, on account of prolonged contact of the meat with water.

There is further known an apparatus for recovering meat of small crustaceans, comprising a mechanism for breaking-up the shell of crustaceans, including a loading device and a breaking-up chamber with a connection for feeding-in the working agent and an outlet pipe provided with a diffuser, and a mechanism for separating the meat from other components of crustaceans (cf. U.S. Pat. No. 4,307,492 dated Dec. 29, 1981). The mechanism for separating the meat from other components of crustaceans includes a vertical working chamber filled with a liquid and a loading funnel receiving therein the diffuser of the shell breaking-up mechanism. The upper part of the working chamber is flaring outwardly and has an overflow pipe and a pipe connecting it with the loading funnel. The central part of the vertical chamber accommodates a connection for feeding-in the working liquid, while its bottom part is connected with an overflow line with a liquid-type ejector mounted at its inlet. The upper end of the overflow line is situated above the top level of the liquid in the vertical working chamber. The separation of the meat from other components of krill fed from the diffuser into the loading funnel and therefrom into the vertical chamber takes place as the outcome of the creation in the chamber of an ascending flow of the liquid. The rate of this flow is selected so that the meat should fall out or sink in the chamber, to be carried away from its bottom part via the overflow line, while the rest of the components are carried up by the ascending flow of the liquid into the upper part of the chamber, to be removed therefrom via the overflow pipe. This apparatus has been found not only to break-up efficiently the shells and other inedible components of krill, but also to separate the meat efficiently from other components. In its operation, the time of contact with the working fluid does not exceed two minutes, which provides for a fine quality of the meat produced.

However, prolonged experience of operating the apparatus under real production conditions, including operating it aboard sea-borne vessels, has brought to light its following short-comings. A considerable part of the components of krill has in many cases positive buoyancy. When getting into the loading funnel of the vertical working chamber, these components oppose the settling of the meat in the funnel and its uniform feed along the connection pipe into the upper part of the vertical chamber. This fact curbs down the throughput of the apparatus and in some cases causes clogging of the loading funnel, calling for an emergency stoppage of the apparatus. Furthermore, the positive-buoyancy components, when entering the upper part of the working chamber, swiftly rise in the ascending flow of the liquid and take therealong a considerable quantity or share of the meat, which quantity is subsequently carried away with the waste. Consequently, the actual throughput of one module or unit of the apparatus has been limited to 70–75 kilograms per hour of the loaded mixture of broken-up krill, and as many as 20 percent of lumps of pure, clean meat have been found to be carried away with the waste.

DISCLOSURE OF THE INVENTION

The present invention has for its aim the creation of an apparatus for recovering meat of small crustaceans, of a design providing for stepping up its throughput and the yield of the meat.

This aim is attained in an apparatus for recovering meat of small crustaceans, comprising a mechanism for breaking-up the shell of the crustaceans, including a loading device and a breaking-up chamber with a connection for feeding-in the working agent and an outlet pipe, and a mechanism for separating the meat from other components, including a working chamber with a loading funnel, which apparatus, in accordance with the invention, is provided with a mechanism for separating easily rising components of the crustaceans, arranged intermediate the shell breaking-up mechanism and the mechanism for separating the meat, this new mechanism including a separating chamber filled with the working liquid, the chamber having in the upper part thereof a connection pipe for withdrawing the surfaced components of the crustaceans and in the bottom part thereof a line for withdrawing the settled components of the crustaceans, its inlet being provided with a liquid ejector and its outlet end being situated above the level of the liquid in the separating chamber and above the loading funnel of the mechanism for separating the meat, and a connection line connecting the separating chamber with a receiving hopper underlying the outlet end of the outlet pipe of the shell breaking-up mechanism, and a working liquid feed line.

It is expedient that the receiving hopper should have a flat bottom which is either horizontal or gently sloping toward the connection line, arranged above the level of the liquid in the separating chamber.

It is further expedient to arrange in the separating chamber, above the level of the working liquid therein, a device for directing the floating mass of components of the crustaceans toward the connection for their removal.

This device may include a conveyer with a web carrying scraper blades on its outer surface.

Alternatively, this device may include a drum rotatable about its axis and having scraper blades spaced about its circumference.

Alternatively still, this device may include a manifold communicating with the working fluid feed line and having nozzles for directing jets of the working fluid along the surface of the liquid in the separating chamber.

The apparatus for recovering meat of small crustaceans, constructed in accordance with the present invention, provides for stepping up the meat yield by as many as 20 percent, as compared with the meat yield of the apparatus of the prior art. Surfacing of the waste in the loading funnel of the meat-separating mechanism is precluded, as the readily surfacing waste has been previously removed; the eventuality of the loading funnel becoming clogged is likewise prevented, which allows for increasing the throughput of the mechanism and enhancing its performance reliability. With the bottom of the loading chamber of the mechanism for removing the easily rising waste being in the form of a horizontal or gently sloping plane arranged above the level of the working liquid in the separating chamber, surfacing of the waste in the loading chamber of this mechanism is also precluded, same as clogging of the chamber, which provides for its performance with reliability and high throughput. As a result, the throughput of an apparatus embodying the invention can be nearly twice as big as that of the apparatus of the prior art, which allows for utilizing the disclosed apparatus in the development of highly efficient production plant.

SUMMARY OF THE DRAWINGS

The invention will be further described in connection with its exemplary embodiments and appended drawings, wherein, in accordance with the invention.

PREFERRED EMBODIMENT OF THE INVENTION

Figure 1:
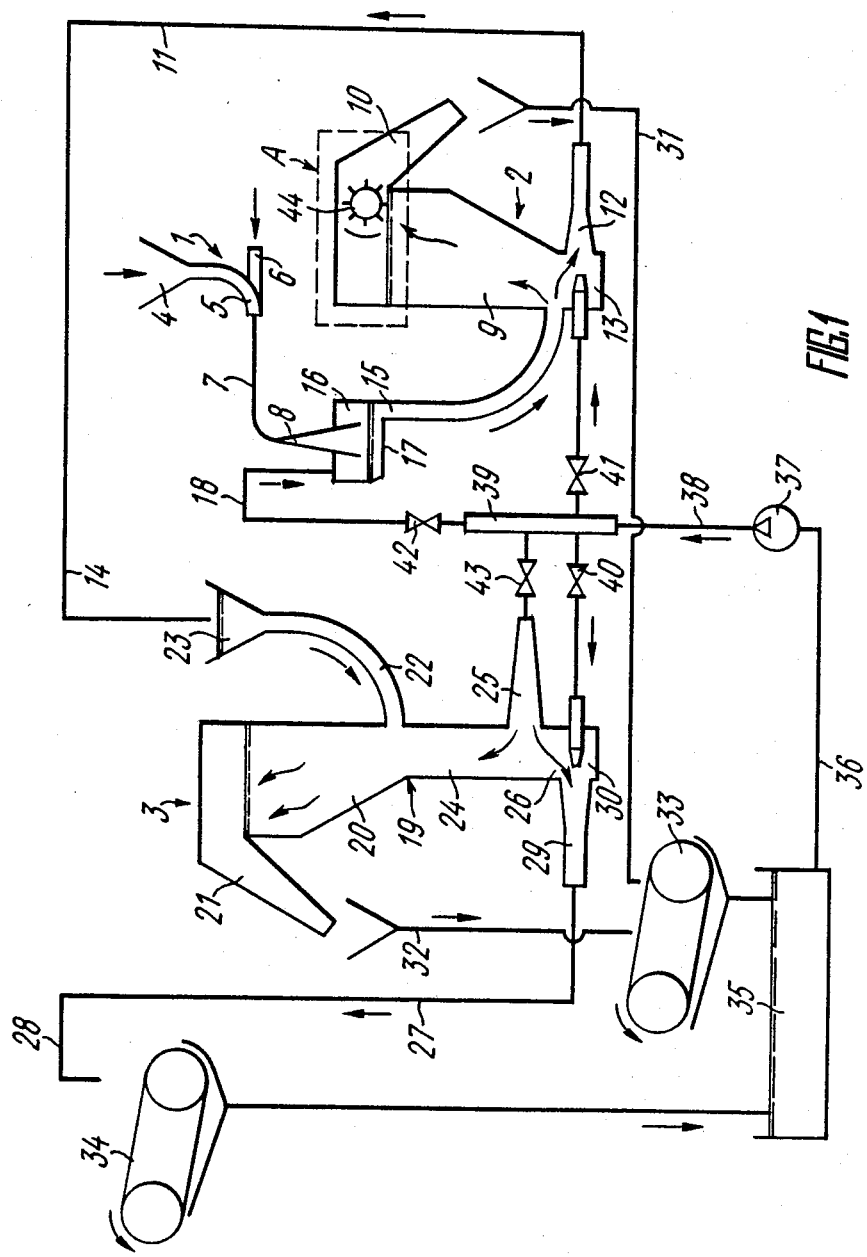
FIG. 1 is a general schematic view of an apparatus for recovering meat of small crustaceans.

The apparatus for recovering meat of small crustaceans comprises, arranged in succession along the path of processing the crustaceans, a shell breaking-up mechanism 1 (FIG. 1), a mechanism 2 for separating easily rising components of the crustaceans and a mechanism 3 for separating meat from other components of the crustaceans.

The working agent or fluid used in the apparatus can be compressed air, sweet or sea water, or else steam.

The shell breaking-up mechanism 1 includes a loading device 4, a breaking-up chamber 5 with a connection 6 for feeding the working fluid into the chamber and an outlet connection 7 provided with the diffuser 8 at its end.

The mechanism 2 for separating easily rising components of the crustaceans includes a separating chamber 9 filled with the working liquid and provided at its upper part with a pipe 10 for removing the surfaced components. The bottom part of the separating chamber 9 has a line 11 for removing the settled components, its inlet end 12 being equipped with a liquid-type ejector 13, while its outlet end 14 is situated above the level of the liquid in the separating chamber 9. The bottom part of the separating chamber 9 is connected via a connection pipe 15 with a receiving hopper 16 which has a flat bottom 17, either horizontal or gently sloping (by approximately 5° to 10°) toward the connection pipe 15, situated above the liquid level in the separating chamber 9. The receiving hopper 16 receives the diffuser 8 of the shell breaking-up mechanism 1, and also a line 18 for supplying the working liquid.

The mechanism 3 for separating the meat from other components of the crustaceans includes a vertical working chamber 19 filled with the working liquid. The upper part 20 of the chamber 19 is outwardly flaring and is provided with an overflow pipe 21, as well as with a pipe 22 communicating with the loading funnel 23 receiving therein the end 14 of the overflow line 11 of the mechanism 2 for separating the easily rising components of the crustaceans. The central part 24 of the vertical chamber 19 is provided with a pipe 25 for supplying the working liquid, while its bottom part 26 is connected with an overflow line 27 of which the outlet end 28 is situated above the level of the liquid in the chamber 19, while its inlet end 29 accommodates a liquid-type ejector 30. The overflow pipes 10 and 21, respectively, of the separating chamber 9 and of the chamber 19 are connected via lines 31 and 32 with the mesh conveyor 33 for carrying away the waste, while the outlet end 28 of the overflow line 27 overlies a mesh conveyor 34 for carrying the meat. Underlying the conveyers 33 and 34 is a tank 35 for the working liquid connected via a line 36 with a recirculation pump 37 which, in its turn, is connected via a line 38 to a manifold 39. The manifold 39 is connected via valve-controlled lines 40, 41, 42 and 43 to the nozzles of the ejectors 30 and 13, the line 18 and the pipe 25, respectively. Arranged in the separating chamber 9 above the level of the liquid is a device 44 for directing the mass of the surfaced components of the crustaceans toward the pipe 10 for their removal.

Figure 2:
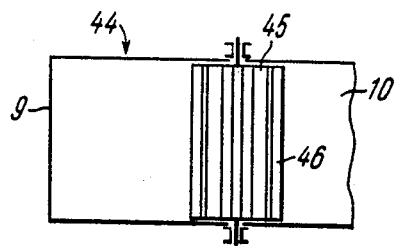
FIG. 2 is an enlarged view in plan of the area A of FIG. 1.

In one of its modifications, the device 44 includes a drum 45 (FIG. 2) mounted for rotation about its symmetry axis and having scraper blades 46 secured with circumferential spacing to its periphery.

Figure 3:
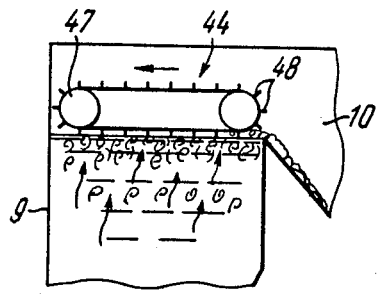
FIG. 3 is a front view on a larger scale of a modification of the area A in FIG. 1.

In its other modification, the device 44 (FIG. 3) includes a conveyor 47 with scraper blades 48 mounted on the outer surface of its web.

Figure 4:
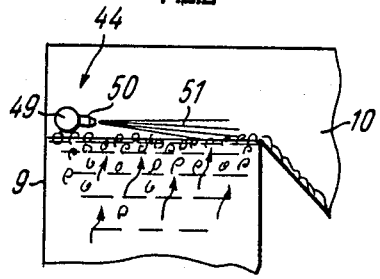
FIG. 4 is a front view on a larger scale of yet another modification of the area A in FIG. 1.
Figure 5:
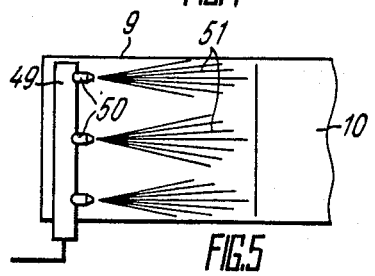
FIG. 5 is a view in plan of the modification of FIG. 4.

In its third embodiment, the device 44 (FIGS. 4 and 5) includes a manifold 49 communicating with the line for supplying the working liquid (not shown in FIGS. 4, 5) and having nozzles 50 for directing jets 51 of the working fluid along the surface of the liquid in the separating chamber 9.

The apparatus operates, as follows.

The tank 35 (FIGS. 1–5) is filled with the working liquid, e.g. sea or sweet water. The pump 37 is energized, the valves 40, 41, 42 and 43 are opened, and the separating chamber 9, the vertical working chamber 19, the loading funnel 23 and the pipes 15 and 22 are filled with the working liquid. The valves 41 and 42 are adjusted to set a supply rate of the working liquid into the mechanism 2 for removing easily rising components of the crustaceans, ensuring that the line 11 is completely filled with the liquid overflowing through the outlet end 14 of the line 11, whereas the flow rate of the liquid through the line 11 and pipe 15 is sufficient for conveying the components of the crustaceans through them. The rate of the ascending flow in the separating chamber 9 is set at the minimum value, to be far below the velocity of the hovering descent of the heavier components of the crustaceans, e.g. of krill, while the minimum amount of the liquid should pour out from the pipe 10, being just sufficient for carrying therewith via the pipe 10 the components of krill floating on the surface of the liquid in the separating chamber 9. The valves 40 and 43 are adjusted to set the supply rate of the working liquid into the meat separating mechanism 3, ensuring that the overflow line 27 is completely filled, the liquid overflows through the outlet end 28 of the line 27, and its flow rate is sufficient to carry the meat through this line 27. Meanwhile, owing to the liquid being fed into the central part 24 of the chamber 19 via the pipe 25, and to the outlet end 28 of the line 27 being arranged above the level of the liquid in the chamber 19, there is produced as ascending flow of the working liquid in the central and upper parts 24 and 20 of the vertical chamber 19, the velocity of this ascending flow being set to be somewhat higher than the hovering descent velocity of the inedible heavier components of the crustaceans, but lower than the hovering descent velocity of the meat.

The working agent or fluid is fed through the pipe 6, while the crustaceans, e.g. krill are fed into the loading device 4 providing uniform metered feed of the initial material. Krill is ejected by the jet of the working fluid and directed into the shell breaking-up chamber 5 where it is acted upon by the high-velocity jet of the working fluid producing suction at the outer surface of krill. The inter-cavity pressure immediately breaks up the shell and severs the ties of the shell with the meat and the ties of the cephalothorax with the rear extremity. The meat of krill is conveyed jointly with the rest of the components via the line 7, through the diffuser 8 lowering the velocity of the stream, into the receiving hopper 16 of the mechanism 2 for removing the easily rising components. Owing to the bottom 17 of the hopper 16 being situated above the level of the working liquid in the chamber 9, there is maintained on the bottom 17 of the hopper 16 but a thin layer or film of the liquid, moving toward the pipe 15. Therefore, the easily rising components of krill are not given sufficient time to surface in the hopper 16, and the working liquid from the pipe 18 flushes them jointly with the rest of the components of krill into the connection pipe 15 which directs them into the bottom part of the separating chamber 9. Here the easily rising components rise and surface, to be taken in the upper part of the chamber 9 by the scrapers 46 or 48 of the device 44, or else to be carried along by the jets 51 of the working fluid, toward the pipe 10 for their withdrawal via the line 31, onto the waste conveyor 35. With the provision of the device 44 for directing the mass of the surfaced components of the crustaceans toward the pipe 10 for their withdrawal, the rising velocity of the easily rising components in the chamber 9 is kept at the minimum, owing to an ascending flow of the working liquid in this chamber being practically absent. Consequently, lumps of meat are not taken up by the rising waste and sink positively with the rest of the relatively heavy components of krill, to be sucked into the funnel of the ejector 13 arranged at the bottom of the separating chamber 9, and the line 11 conveys them into the loading funnel 23 of the mechanism 3 for separating the meat from other components of the crustaceans, the flow of the working fluid carrying them through the pipe 22 into the upper part of the vertical chamber 19. Here the meat is separated from the remaining other components of krill. The meat sinks in the ascending flow of the working fluid whose velocity is lower than the hovering descent velocity of the meat, while the rest of the components are raised by the ascending flow of the liquid into the upper part of the chamber 19, since the velocity of the flow is above the hovering descent velocity of these remaining components of krill. From the bottom part 26 of the chamber 19 the sunk meat is taken by the liquid ejector 30 into the line 27 which conveys it onto the meat conveyor 34 where it is separated from the liquid flowing down into the tank 34 to be recirculated. The waste is carried from the upper part 20 of the chamber 19 via the pipe 21 and line 32 onto the waste conveyor 33 where the working liquid is likewise separated to flow down into the tank 35. The conveyors 34 and 33 carry the meat and the waste, respectively, for further processing. The meat can be either canned or deep-frozen, while the waste can be used for preparing animal feed or for processing into other products.

INDUSTRIAL APPLICABILITY

The invention is predominantly intended for processing antarctic shrimp or krill. Furthermore, it may be widely utilized in the fish-processing industry for processing sea or ocean shrimp, as well as in various sectors of agriculture and mixed fodder production.

We claim:

1. Apparatus for recovering meat of small crustaceans, comprising:
    a shell breaking-up mechanism for breaking up the shells of the crustaceans, said shell breaking-up mechanism comprising:
        a loading device for receiving the crustaceans,
        breaking-up means downstream of said loading device for breaking up the shells of the crustaceans,
        a first chamber downstream of said breaking-up means for receiving from said breaking-up means the crustaceans having broken-up shells, said first chamber having a bottom and an outlet adjacent said bottom, and
        means for providing a working liquid to said first chamber;
    an intermediate mechanism for separating easily rising components of said crustaceans having broken-up shells, said intermediate mechanism comprising:
        an intermediate chamber downstream of said first chamber for receiving from said outlet of said first chamber said crustaceans having broken-up shells, via a conduit extending between said outlet of said first chamber and an inlet of said intermediate chamber,
        said inlet being disposed adjacent a bottom of said intermediate chamber and below said outlet of said first chamber,
        a working liquid substantially filling said intermediate chamber, said intermediate chamber having a lower outlet disposed in generally opposed relationship to said inlet, jet means for providing a stream of a working liquid directed from a region adjacent said inlet toward said lower outlet, for transporting to said lower outlet those portions of said crustaceans which do not easily rise, and surfaced component removing means disposed adjacent a top of said intermediate chamber for withdrawing from said intermediate chamber via an upper outlet thereof easily rising components of said crustaceans which rise in the working liquid disposed within said intermediate chamber; and a meat-separating mechanism for separating the meat from other portions of said crustaceans, said meat-separating mechanism comprising:

loading means downstream of said intermediate chamber for receiving from said lower outlet of said intermediate chamber those portions of said crustaceans which do not easily rise, a conduit for transporting, from said lower outlet of said intermediate chamber to said loading means, those portions of said crustaceans which do not easily rise, said conduit having an outlet end adjacent said loading means and disposed above said loading means and above the level of liquid within said intermediate chamber, a third chamber for receiving from said loading means those portions of said crustaceans which do not easily rise, and meat-separating means including a working liquid operatively associated with said third chamber for separating the meat of said crustaceans from other portions of said crustaceans disposed within said third chamber.

2. The apparatus according to claim 1, wherein the bottom of said first chamber extends in a generally horizontal direction.

3. The apparatus according to claim 2, wherein the bottom of said first chamber gradually slopes toward said outlet thereof.

4. The apparatus according to claim 1, wherein said surfaced component removing means of said intermediate chamber comprises a surface clearing device disposed above the level of liquid within said intermediate chamber, for directing the easily rising components of said crustaceans which rise to the surface of the working liquid within said intermediate chamber, toward said upper outlet of said intermediate chamber.

5. The apparatus according to claim 4, wherein said surfaced component removing means comprises a conveyer having a movable web adjacent the surface of the working liquid within said intermediate chamber, and a plurality of blades extending outwardly from said web.

6. The apparatus according to claim 4, wherein said surfaced component removing means comprises a drum rotatably mounted about a central longitudinal axis thereof with a cylindrical surface generally parallel to and adjacent the surface of the working liquid within said intermediate chamber, and a plurality of blades extending outwardly from the cylindrical surface of said drum.

7. The apparatus according to claim 4, wherein said surfaced component removing means comprises fluid jet means for directing a plurality of fluid streams across the surface of the working liquid within said intermediate chamber, toward said upper outlet thereof.

* * * * *